Dec. 28, 1943. C. F. CRUMB ET AL 2,337,739
PICKUP BALER
Filed Sept. 14, 1940 4 Sheets-Sheet 1

Inventors
Charles F. Crumb
Russell R. Raney
Lewis E. Smith
By Paul O. Pippel
Att'y.

Dec. 28, 1943.  C. F. CRUMB ET AL  2,337,739
PICKUP BALER
Filed Sept. 14, 1940  4 Sheets-Sheet 2
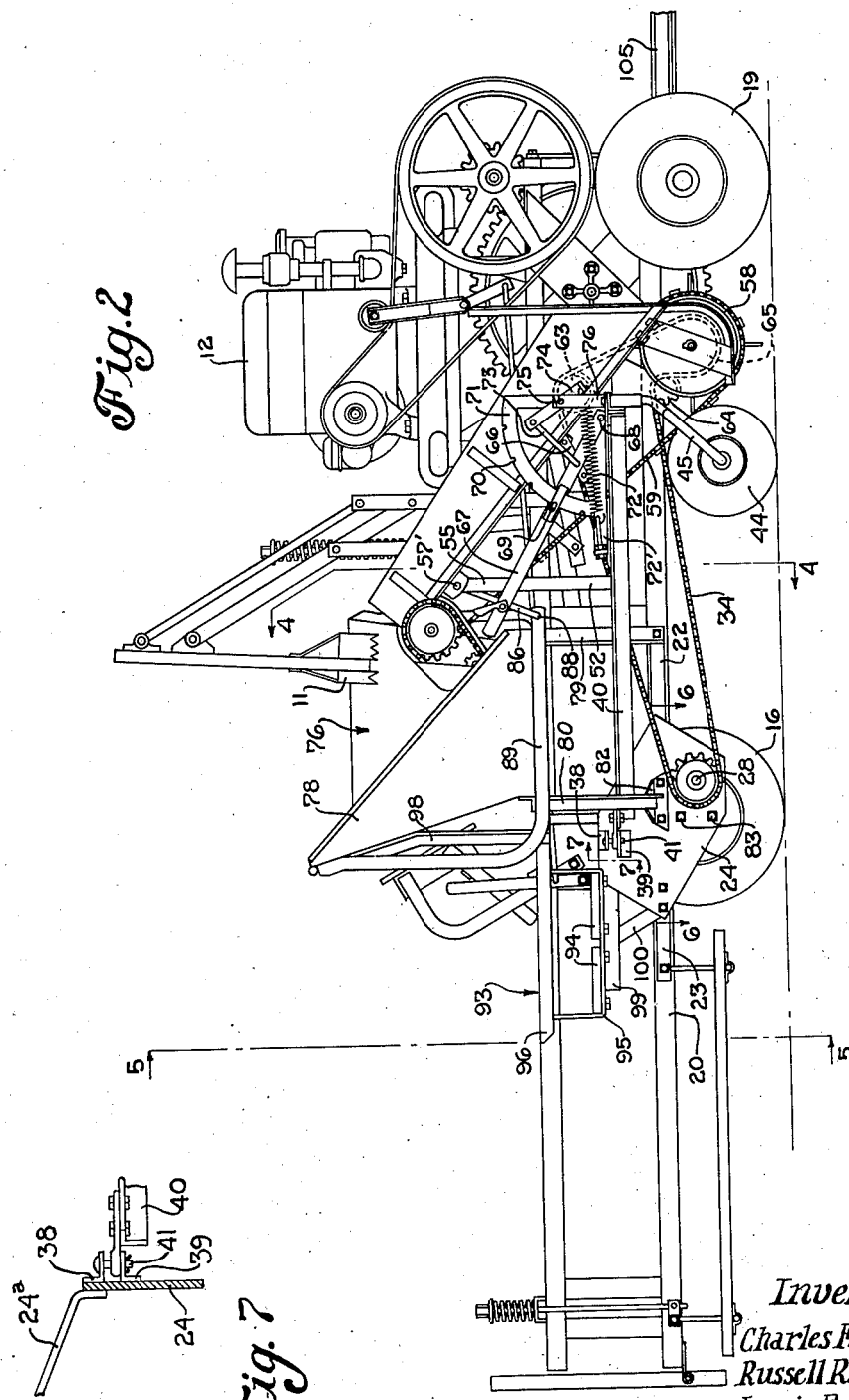
Inventors
Charles F. Crumb
Russell R. Raney
Lewis E. Smith
By Paul O. Pippel
Att'y.

Dec. 28, 1943.    C. F. CRUMB ET AL    2,337,739
PICKUP BALER
Filed Sept. 14, 1940    4 Sheets-Sheet 3

Inventors
Charles F. Crumb
Russell R. Raney
Lewis E. Smith
By Paul O. Pippel
Att'y.

Dec. 28, 1943.     C. F. CRUMB ET AL     2,337,739
PICKUP BALER
Filed Sept. 14, 1940     4 Sheets-Sheet 4

Inventors
Charles F. Crumb
Russell R. Raney
Lewis E. Smith
By Paul O. Pippel
Att'y.

Patented Dec. 28, 1943

2,337,739

UNITED STATES PATENT OFFICE 2,337,739

PICKUP BALER

Charles F. Crumb, Chicago, Ill., and Russell R. Raney and Lewis E. Smith, Auburn, N. Y., assignors to International Harvester Company, a corporation of New Jersey Application September 14, 1940, Serial No. 356,794

6 Claims. (Cl. 56—355)

This invention relates to a pick-up baler. More specifically it relates to a supporting framework for a pick-up connected to a baler unit.

Pick-up balers are known which include a baler unit mounted on wheels and a pick-up unit mounted on a framework which is carried by an axle of the baler unit extended beyond the baler unit. Very frequently devices of this sort are awkward and hard to handle because they are very heavy. The present invention is concerned with a simplification of the supporting framework for a pick-up unit which connects the pick-up unit to the baler unit.

An object of the present invention is to provide an improved pick-up baler.

A further object is the provision of a simplified supporting structure for a pick-up unit carried at the side of the baler unit.

Another object is to provide an improved trough construction connecting a pick-up unit with a baler unit.

According to the present invention a pick-up unit is carried at the side of a baler unit by means of framework which is pivotally attached at two points at one side of the baler unit and is supported at a third point on a single wheel. A trough connects the pick-up unit and the baler unit and is composed of two sections, one of which is rigidly secured to the baler unit and the other of which is pivotally secured to the first section and is loosely connected to the framework supporting the pick-up.

In the drawings:

Figure 2 is a side view of the structure shown in Figure 1;

Figure 7 is a view taken along the line 7—7 of Figure 2;

Figure 1:
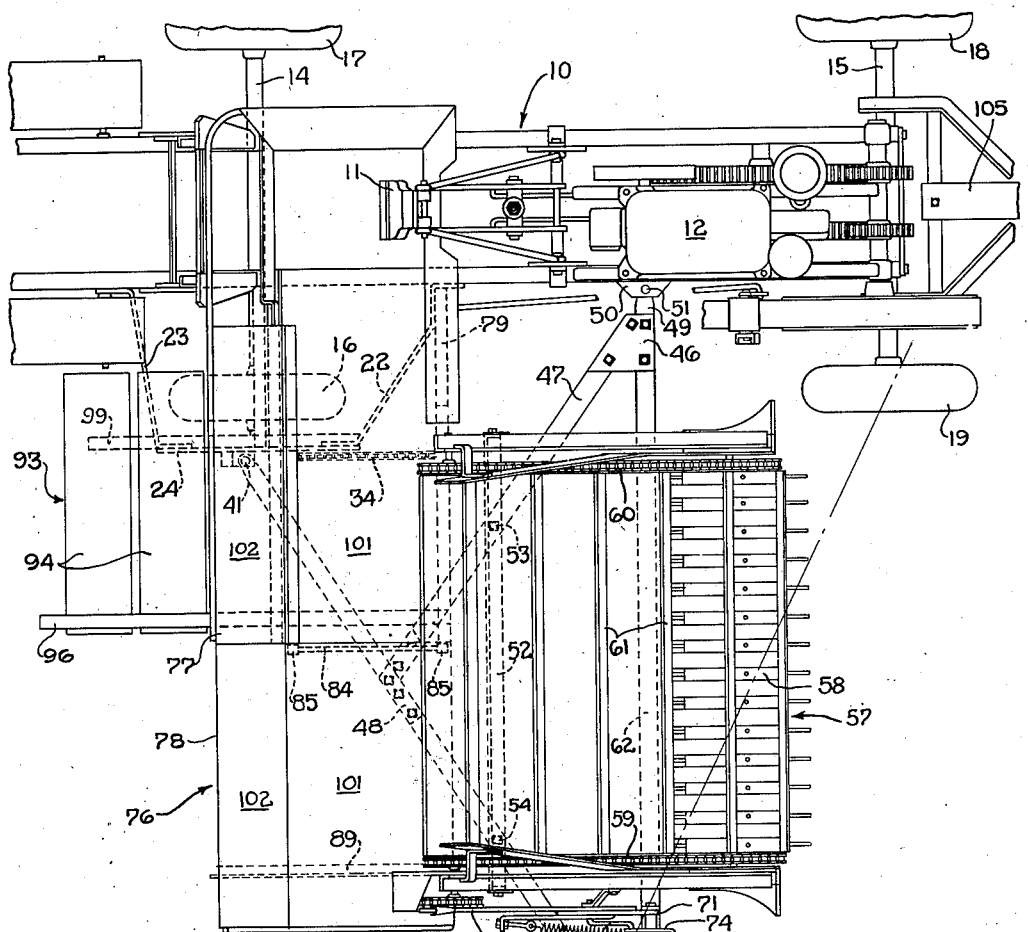
Figure 1 is a plan view showing the improved pick-up baler of the present invention.
Figure 6:
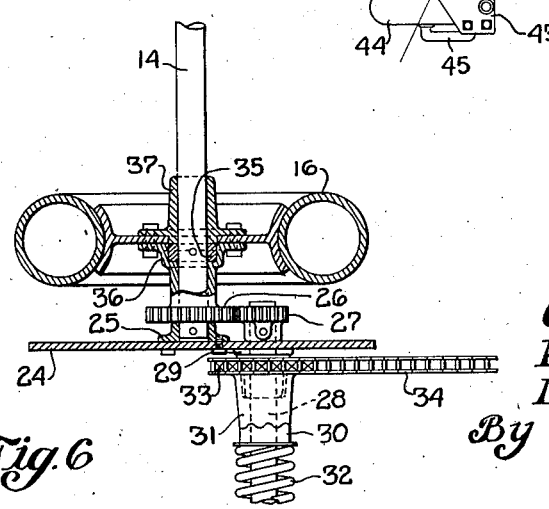
Figure 6 is a view taken along the line 6—6 of Figure 2.
Figure 4:
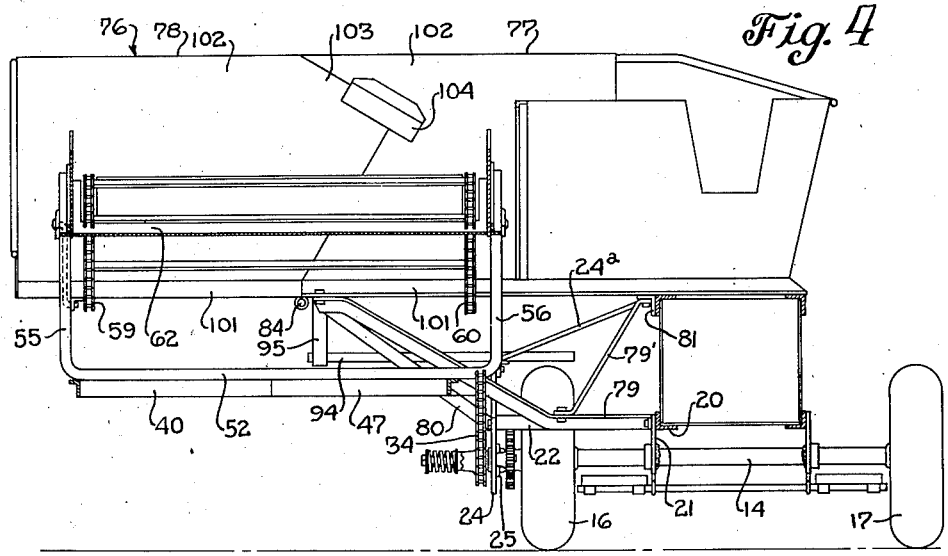
Figure 4 is a view taken along the line 4—4 of Figure 2.

The reference character 10 designates a mobile frame in the form of a baler unit which includes a baling chamber and a reciprocating plunger not shown since they form no part of the present invention, and a feeder head 11. Power for operating the baling unit is supplied by an engine 12 mounted on the unit. The unit is supported on transverse axles 14 and 15 which are in turn carried by wheels 16, 17, 18, and 19. The baling unit includes an angle member 20 carried by means of a plate 21 (Figure 4) mounted upon the axle 14. As seen in Figures 1 and 2, braces 22 and 23 extend outwardly from the angle member 20 on opposite sides of the axle 14. A plate 24 is carried by the braces 22 and 23 outside the wheel 16 and also supported on the end of the axle 14 by means of a casting 25 pinned to the end of the axle 14. As seen in Figure 4, the plate 24 is also supported at its upper end by a brace 24a. As seen in Figure 6, a gear 26 is mounted on the end of the axle 14 adjacent the casting 25 and is secured to the wheel 16 so that it rotates with the wheel. The gear 26 engages a gear 27 secured to a shaft 28 rotatably mounted in a bearing 29 secured to the plate 24. A member 30 is slidably connected on the shaft 28 and is urged toward a member 31 by means of a spring 32. The members 30 and 31 form a clutch. Member 31 carries a sprocket 33 driving a chain 34 which in turn drives the pick-up to be described presently. The parts just described constitute a ground drive for the pick-up. As seen in Figure 6, the wheel 16 is rotatably mounted on the axle 14 and is held against axial movement with respect to the axle by means of a collar 35 secured to the axle 14 and embraced by a portion 36 of the gear 26 securing the wheel to the gear 26 and by a hub 37 also secured to the wheel. Disengagement of the clutch members 30 and 31 permits the ground wheel 16 to rotate without driving the pick-up unit.

As previously described the plate 24 positioned outside the wheel 16 is carried by the braces 22, 23, and 24a and by the axle 14 by means of the casting 25. As seen in Figure 2, angle pieces 38 and 39 are secured to the plate 24 in such a manner that there is a space between them into which the end of an angle member 40 extends. The member 40 is held loosely between the pieces 38 and 39 by means of a pin 41. As seen in Figure 1 the angle member 40 extends generally outwardly from the plate 24 and is secured to another angle member 42 by means of a plate 43. The members 40 and 42 are supported by means of a caster wheel 44 carried on an axle 45. The angle member 42 is connected at its other end by means of a plate 46 to a third angle member 47 connected in turn to a mid-portion of the angle member 40 by means of a plate 48. A piece 49 extends from the connection of the angle members 42 and 47 at the plate 46 and is loosely connected to a bracket 50 carried at the side of the baler unit 10 by means of a pin 51.

As seen in Figures 1 and 4, a member 52 is secured at 53 and 54 to the angle members 47 and 40 so as to extend parallel to the angle member 42. The member 52 has upwardly extending end portions 55 and 56 which pivotally support the upper end of a pick-up unit 57, as at 57'. The pick-up unit 57 need not be described in detail since per se it forms no part of the present invention. It includes a cylinder 58 carried at the lower end near the ground and chains 59 and 60 between which extends a series of transverse bars 61 which move across an inclined floor 62. As previously stated the chain 34 is driven by the ground wheel 16. The chain passes over idlers 63 and 64 and drives a sprocket 65 secured to the pick-up cylinder 58. The lower end of the pick-up 57 is adjustably supported at one end as shown in Figure 2 by a piece 66 connected to a hand lever 67 secured to and pivoted to a shaft 68 extending the width of the pick-up 57. The lever 67 carries a detent mechanism 69 fixable to any one of a number of recesses 70 in an arcuate member 71. The weight of the pick-up is counterbalanced by means of a spring 72 connected at one end to a part 72' secured to the arcuate member 71 and at the other end to the lever 67 by means of a link 73 connected to a lever 74 connected in turn to the spring 72. The lever 74 is secured to a sleeve 74' journaled on a pin 75 in the space between the member 71 and a member 76. Figure 2 shows the adjustable supporting of only one side of the lower end of the pick-up 57, the other side is supported in a similar way, there being a stub lever secured to the shaft 68 and a connection between the stub lever and the pick-up. By adjustment of the lever 67 the pick-up cylinder 58 may be moved toward or away from the ground.

Figure 3:
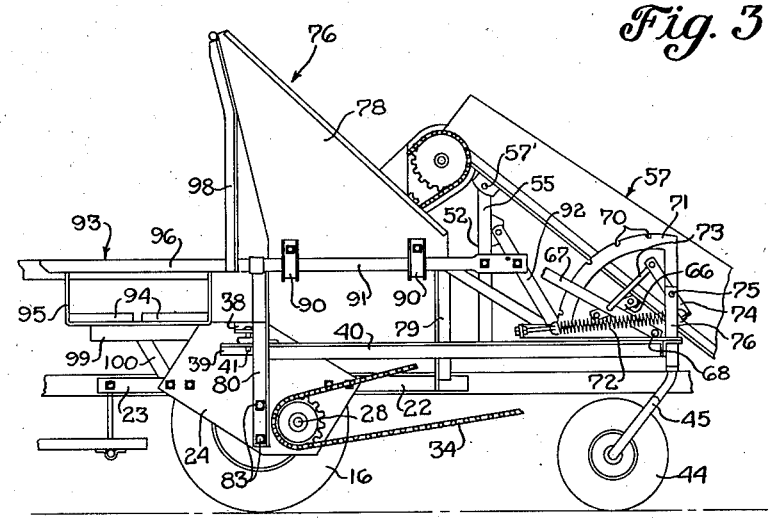
Figure 3 is a side view of a modified form.

As seen in Figures 1 and 2 a trough or platform 76 extends between the baling unit and the upper end of the pick-up unit 57. This trough or platform comprises a section 77 and a section 78. The section 77 is secured to the baler unit 10 by means of supporting members 79 and 80. As seen in Figure 1, the member 79 is secured to the side of the baler unit by being attached to the portion of the bracing member 22 immediately adjacent its point of attachment to the baling unit. The member 79 is reenforced by a brace 79' extending downwardly from a connection with an angle piece 31 forming part of the baling unit. The supporting member 80 is secured as shown in Figure 2 to the plate 24 by means of a bracket 82. The member 80 in the modification of Figure 3 is connected to the plate 24 by bolts 83 which incidentally connect the casting 25 to the plate 24. The section 78 is pivotally connected to the fixed section 77 by means of a pin 84 mounted in bearings 85 on the section 77. In the modification in Figure 2 the section 78 is connected to the vertical portion 55 of the cross member 52 by means of a link 86 pivotally connected at 57' to the portion 55 of the cross member 52 and at 88 to a reenforcing member 89 forming part of the section 78. In the modification of Figure 3 the section 78 is slidably mounted by means of supports 90 on a rod 91 secured to the portion 55 of the cross member 52 and to a cross-brace 92 connecting the portions 55 and the angle member 40.

Positioned at the rear of the fixed section 77 is an operator's platform 93. This platform includes a pair of planks 94 supported at one end on a strap 95 carried by an angle member 96 secured to the section 77 and reenforced by a brace 98 and at the other end on an angle member 99 extending from the plate 24, and reenforced by a piece 100. The sections 77 and 78 each include a floor portion 101 and a back portion 102. The back portion 102 of the section 78 has a part 103 of triangular shape overlapping the back portion 102 of the section 77 on the inner side. One corner of the triangular portion 103 extends beneath a guard 104 secured to the back portion 102 of the section 77 so as to be held thereby.

The operation of the pick-up baler will now be described. The baling unit 10 and the pick-up unit are moved over the ground by some separate source of power such as a tractor, not shown, attached to a draft member 105 secured to the baling unit. The rotation of the ground wheel 16 causes the chain 34 to drive the pick-up cylinder 58 and the chains 59 and 60 and thereby move the slat 61 upwardly over the floor 62. Hay is thereby picked up from windrows on the ground and moved upwardly over the floor 62 and deposited on the platform sections 77 and 78. An operator standing on the platform 93 moves the hay along the platform sections 77 and 78 into the baler unit where it is acted upon by the feeder head 11 and the plunger not shown, so as to be formed into bales. If the caster wheel 44 encounters unevennesses in the ground or moves over ground at a different level from that passed over by the ground wheels 16, 17, 18, and 19, the framework supporting the pick-up unit 57 rises and falls as may be required, the pivotal connections of the member 40 with the brackets 38 and 39 by the pin 41 and the piece 49 with the bracket 50 by the pin 51 permitting the necessary up and down movement. The pins 41 and 51 are spaced longitudinally of the baler unit, and the pivotal movement of the framework is about a generally longitudinal horizontal axis. This movement is also facilitated by the supporting of the pick-up unit 57 on only a single caster wheel 44. On Figure 1 a line has been drawn between the caster wheel 44 and the ground wheel 19 of the baler unit. This line, it will be observed, passes approximately through a mid-point of the pick-up cylinder 58. Thus the wheels 19 and 44 act substantially as gauge wheels would act which were positioned along the line of the cylinder 58. Being in front of the cylinder and behind it, they gauge in an approximate way the ground over which the cylinder passes. This arrangement of a caster wheel supporting the pick-up unit positioned behind the pick-up cylinder 58 permits a simplified supporting framework for the pick-up unit. The angle members 40 and 47 are shorter with the wheel 44 behind the pick-up cylinder 58 than they would be if the wheel were in front of the cylinder. The substitution of a feeder's platform in the form of the floor portion 101 composed of the sections 77 and 78 for a regular cross conveyor is of a considerable advantage in that it prevents the loss of various component parts such as seeds from the material to be baled.

Figure 9:
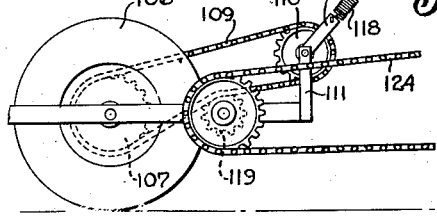
Figure 5:
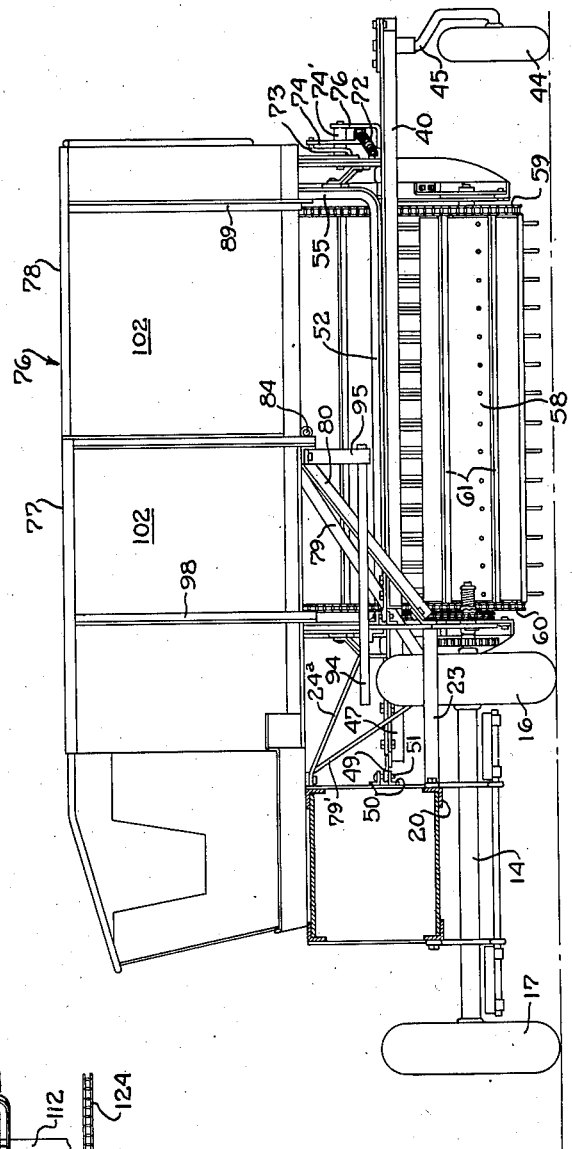
Figure 5 is a view taken along the line 5—5 of Figure 2.
Figure 8:
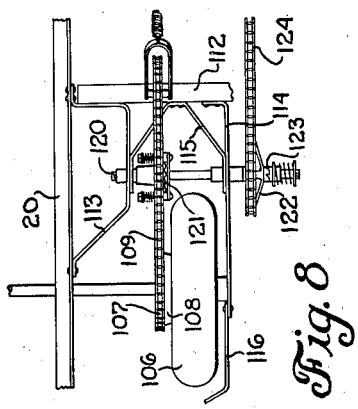
Figure 8 is a view similar to Figure 6 showing a modified form of drive for the pick-up unit; and, Figure 9 is a side view of the modified form of Figure 8, showing in part a structure like that shown in Figure 3.

Figures 8 and 9 show a modified form of drive which has sprockets and a chain instead of gears. A ground wheel 106 carries a sprocket 107 on a hub extension 108 on the inner side of the wheel. A chain 109 is wrapped around the sprocket 107 and also an idler gear 110 carried on a bracket 111 extending upwardly from a part 112 similar to part 79 (Figures 4 and 5). The part 112 is connected to frame member 113 secured to angle member 20 and also to member 114 and to a reenforcing member 115 connected to members 113 and 114. Member 114 is supported on the wheel 106. The member 116 is secured to member 114 and to angle member 20 in the manner of brace 23 (Figure 1) and so completes the bracing. A U-shaped member 117 and spring 118 connect the bracket 111 and sprocket 110 with a portion of the baler unit framework, not shown, so that the chain 109 is held tight. The underside of the chain 109 meshes with a sprocket 119 mounted on a shaft 120 journaled in members 113 and 114. A slip clutch 121 connects the sprocket 119 to the shaft 120. A sprocket 122 is mounted on the shaft 120 outside of the member 114 and is connected to the shaft by means of an overrunning clutch 123. A chain 124 is wrapped around sprocket 122 and is connected with the pick-up unit in the same manner as chain 34 (Figure 1). Drive is transmitted from the ground wheel 106 through the sprocket 107, the chain 109, the sprocket 119, the clutch 121, the shaft 120, the clutch 123, the sprocket 122, and the chain 124 to the pick-up unit. If something stops the pick-up device without a stopping of movement of the machine over the ground, the slip clutch prevents injury to the pick-up device by allowing the pick-up device to stop without a stopping of the ground wheel 106. The overrunning clutch 123 permits the machine to run backwards without driving the pick-up unit.

It will be apparent from the foregoing disclosure that a new and novel pick-up baler has been provided. The intention is to limit the invention only within the scope of the appended claims.

What is claimed is:

1. In combination, a mobile crop-treating unit, a mobile pick-up device positioned alongside of the crop-treating unit and including an elevating conveyor extending to the level of the top of the unit and ground-engaging supporting means, a horizontal means extending transversely of the unit at the level of the top thereof from the top of the elevating conveyor to the top of the unit, over which means crops are forwarded from the elevating conveyor to the crop-treating unit, means mounting the last-mentioned means on the crop-treating unit, means coupling the pick-up device to the crop-treating unit at two points spaced longitudinally thereof and spaced from the forwarding means for enabling the pick-up device to be driven alongside the crop-treating unit and for cooperating with the ground-engaging supporting means of the pick-up device to support the pick-up device entirely independently of the forwarding means.

2. In combination, a mobile baling unit having a feed opening in the top thereof, a mobile pick-up device positioned alongside of the baling unit and including an elevating conveyor extending to the level of the top of the baling chamber and ground-engaging supporting means, a means extending transversely of the baling unit from the elevating conveyor to the feed opening in the baling unit, over which means crops are forwarded from the elevating conveyor to the baling unit, means mounting the forwarding means on the baling unit, means coupling the pick-up device to the baling unit at two points spaced longitudinally thereof and spaced from the forwarding means for enabling the pick-up device to be drawn alongside the baling unit and for cooperating with the ground-engaging supporting means of the pick-up device to support the pick-up device entirely independently of the forwarding means.

3. In combination, a mobile crop-treating unit, a mobile pick-up device positioned adjacent the crop-treating unit, ground-engaging means for supporting at least a substantial portion of the weight of the pick-up device independently of the crop-treating unit, means flexibly connecting the crop-treating unit and the pick-up device for causing them to be moved conjointly, means over which crops are forwarded from the pick-up device to the crop-treating unit, said means including a first horizontal section adjacent the crop-treating unit and a second horizontal section spaced from the crop-treating unit, means mounting the first section on the crop-treating unit, means flexibly supporting the second section partially on the first section, and means flexibly supporting the second section partially on the pick-up device.

4. In combination, a crop-treating unit having ground-engaging supporting means for permitting movement of the unit in a certain direction over the ground, a pick-up device positioned alongside the crop-treating unit, ground-engaging means for supporting at least a substantial portion of the weight of the pick-up device independently of the crop-treating unit, means flexibly connecting the pick-up device and the crop-treating unit for causing movement of the crop-treating unit in its said direction to effect a similar movement of the pick-up device, means over which crop material is conveyed transversely of the direction of movement of the crop-treating device from the elevating conveyor to the top of the crop-treating unit, said means including a first horizontal section adjacent the crop-treating device and a second horizontal section adjacent the pick-up device, means rigidly mounting the first section on the crop-treating device, means flexibly supporting the second section partially on the first section, and means flexibly supporting the second section partially on the crop-treating unit.

5. In combination, a crop-treating unit having ground-engaging supporting means for permitting movement of the unit in a certain direction over the ground, a pick-up device positioned alongside the crop-treating unit and including an elevating conveyor extending to the level of the top of the crop-treating unit, ground-engaging means for supporting at least a substantial portion of the weight of the pick-up device independently of the crop-treating unit, means flexibly connecting the pick-up device and the crop-treating unit for causing movement of the crop-treating unit in its said direction to effect a similar movement of the pick-up device, means over which crop material is conveyed transversely of the direction of movement of the crop-treating device from the elevating conveyor to the top of the crop-treating unit, said means including a first horizontal section adjacent the top of the crop-treating device and a second horizontal section adjacent the top of the elevating conveyor, means rigidly mounting the first section on the crop-treating device, means flexibly supporting the second section partially on the first section, and means flexibly supporting the second section partially on the crop-treating unit.

6. In combination, a mobile baler unit having a feed opening in the top thereof, a mobile pick-up device positioned alongside the baling unit and including an elevating conveyor extending to the level of the top of the baling unit, ground-engaging means for supporting at least a substantial portion of the weight of the pick-up device independently of the baling unit, means flexibly connecting the crop-treating unit and the pick-up device for causing them to be moved along conjointly side by side, means extending transversely to the baling unit, over which means crops are forwarded from the elevating conveyor to the feed opening in the top of the baling unit, said means comprising a first horizontal section adjacent the baling unit and feed opening thereof, a second horizontal section spaced from the baling unit, means rigidly mounting the first section on the baling unit, means flexibly supporting the second section on the first section, and means flexibly mounting the second section on the pick-up device.

CHARLES F. CRUMB.
RUSSELL R. RANEY.
LEWIS E. SMITH.